(12) United States Patent
Fredlund

(10) Patent No.: US 8,685,480 B2
(45) Date of Patent: Apr. 1, 2014

(54) METHOD AND APPARATUS FOR MAKING FOOD CHIPS

(75) Inventor: Anders Fredlund, Malmö (SE)

(73) Assignee: Delights Factory AB, Kavlinge (SE)

( * ) Notice: Subject to any disclaimer, the term of this patent is extended or adjusted under 35 U.S.C. 154(b) by 155 days.

(21) Appl. No.: 12/719,940

(22) Filed: Mar. 9, 2010

(65) Prior Publication Data

US 2010/0209578 A1   Aug. 19, 2010

Related U.S. Application Data

(63) Continuation of application No. PCT/SE2008/051020, filed on Sep. 11, 2008.

(51) Int. Cl.
 *A23L 1/217* (2006.01)

(52) U.S. Cl.
 USPC ............ 426/443; 426/456; 426/467; 426/560

(58) Field of Classification Search
 USPC .................................. 426/443, 456, 467, 560
 See application file for complete search history.

(56) References Cited

U.S. PATENT DOCUMENTS

| | | | |
|---|---|---|---|
| 3,870,141 A | 3/1975 | Lapeyre et al. | |
| 4,283,425 A | 8/1981 | Yuan et al. | |
| 4,800,090 A | 1/1989 | August | |
| 4,906,483 A | 3/1990 | Kloos | |
| 4,919,965 A | 4/1990 | Childers, Jr. | |
| 5,298,707 A | 3/1994 | Sprecher et al. | |
| 5,470,600 A | 11/1995 | Petelle et al. | |
| 5,802,959 A | 9/1998 | Benson et al. | |
| 6,195,908 B1 * | 3/2001 | Crul | 34/343 |
| 2005/0118318 A1 | 6/2005 | Mihalos et al. | |

FOREIGN PATENT DOCUMENTS

| | | |
|---|---|---|
| JP | 59-197399 | 11/1984 |
| WO | 9415481 A2 | 7/1994 |

* cited by examiner

*Primary Examiner* — Lien T Tran
(74) *Attorney, Agent, or Firm* — Gesmer Updegrove LLP

(57) ABSTRACT

An apparatus for making food chips, comprises a source of heat, and a conveyer belt arranged such that, when in use, food chips are held between the belt and the heat source at least a part of the path of the belt, and wherein the belt is steam permeable. Also, a method for making food chips comprising feeding sliced mono layered food between a steam permeable conveyer belt and a heat source and guiding steam from the food through the steam permeable belt.

3 Claims, 2 Drawing Sheets

METHOD AND APPARATUS FOR MAKING FOOD CHIPS

PRIORITY INFORMATION

This application is a continuation of PCT Application No. PCT/SE2008/051020, filed Sep. 11, 2008, which claims priority to Swedish Application No. 0702037-3, filed on Sep. 13, 2007. Both applications are incorporated herein by reference in their entireties.

BACKGROUND OF THE INVENTION

1. Field of the Invention

The invention relates to a method and apparatus comprising a heat source for making food chips.

2. Brief Description of the Art

Potato food chips and other snack foods are very popular. There are many methods in preparing snack foods such as potato food chips and other forms of vegetable and grain food chips such as corn (maize) or tortilla food chips. Most of these methods rely on cooking the snacks in oil, known as deep frying. The deep frying creates a very crisp structure and lower the moisture content but will allow some uptake of oil. The frying process typical results in a fat content of 20-45% of fat. Fat is very high in calories and heavy intake of calories might lead to overweight. Apart from overweight, high intake of fat may also lead to other health problems such as heart diseases and joint problems, such as knee damages. Most major health organizations thus recommend that no more than thirty percent (30%) of the total calorie intake shall be fat related.

Generally, there are two very important factors when it comes to food; price and taste. It has therefore been an object over a long period of time to cost effectively produce a fat-free snack food product, for instance potato food chips that looks, feels and taste similar to deep fried food chips. Having recognized the long felt need, other inventors have attempted to produce commercially acceptable fat-free potato food chips. Earlier attempts have required considerable economic investments in microwave or radio wave techniques or have not got the desirable taste and structure similar to deep fried food chips.

In a process disclosed in U.S. Pat. No. 4,283,425, a single step of heating by microwaves (910-915 mhz or 2400-2500 mhz) was used. The slices were also dipped in or sprayed with an edible oil prior to final microwave cooking, which led to a fat content of 3-5% by weight, which as such is too high to be classified as fat-free. Thus, this product was basically a "low-fat" potato food chip.

In a further process disclosed in U.S. Pat. No. 4,800,090, sliced potatoes were first subjected to an infrared (high intensity 46 micron wavelength) heating step to heat their exterior, then to a microwave energy (915-2450 mhz) heating step to heat their interior, and finally to another infrared (4-6 micron wavelength) heating step to brown them into a crisp, fat-free, potato food chip snack food product that was low in calories and had a long shelf life.

U.S. Pat. No. 4,906,483 discloses a process in which the microwave cooking step was employed early in the process to activate the release of starch while the potato slices were still immersed in water followed by a cold water rinse and final cooking in radiant heat until brown and crisp to produce a fat-free potato food chip.

U.S. Pat. No. 5,470,600 discloses a process in which the slices are initially cooked in a three zone primary oven by first radiant heating the slices and then subjecting the slices to two successive stages of forced air heating and a final cooking in a dielectric heater by subjecting the slices to radio frequency electromagnetic waves having a long wavelength.

A still further fat-free process is disclosed in U.S. Pat. No. 4,919,965, in which the potato slices are simultaneously finally cooked by compressing them between dual opposed heating surfaces which were 50% relieved driving the moisture into the voids in the cooking surfaces to produce a fat-free potato food chip.

SUMMARY OF THE INVENTION

It is an object of the present invention to fill a long felt need by providing an apparatus and a method for making a fully cooked fat-free food chip product with a long shelf life, which product looks, feels and tastes like a conventional deep fried food chip in an economical continuous process without using any cooking oil whatsoever.

In particular the invention relates to an apparatus for making food chips, comprising a source of heat, characterized in that it further comprises a conveyer belt arranged in such a way that, when in use, food chips are held between the belt and the heat source at least a part of the path of the belt, and wherein the belt is steam permeable.

In a preferred embodiment of the invention at least the food chip contact surface of the belt comprises a non-sticky material.

In a preferred embodiment of the invention it comprises a second belt arranged in such a way that, when in use, food chips are held between the two belts, the second belt being arranged between the first belt and the heat source, wherein at least a part of the path of the two belts are arranged adjacent said heat source and wherein the belts are arranged for synchronous movement at said part of the path for heating the food chips.

In a preferred embodiment of the invention said belts are glass fiber belts.

In a preferred embodiment of the invention said heat source is a drum dryer.

In a preferred embodiment of the invention the apparatus further comprises a heating jacket arranged at least partly circumferential of the drum dryer and the at least one belt.

A further aspect of the invention relates to a method for making food chips, comprising;

feeding sliced food in a mono layer between a steam permeable conveyer belt and a heat source, guiding steam or vaporized water from the food through the steam permeable belt, and recovering the thus prepared food chips from the conveyor belt.

In a preferred embodiment of the invention the method further comprises holding the sliced food using an open mesh conveyer belts and moving the belts to pass through forced hot air.

In a preferred embodiment of the invention the method further comprises applying a pressure on the food and the heat source with the belt conveyer.

According to the present invention, an apparatus for making food chips, comprises a source of heat and a conveyer belt arranged such that, when in use, food chips are held between the belt and the heat source at least along a part of the path of the belt, and wherein the belt is steam permeable. The steam permeable belt allows for steam to leave the food chip while being heated and hence dried.

Therefore the apparatus and method of the present invention is suitable for the preparation of fat free food chips made from a variety of vegetables, grains, fruit and the like, which can be cut or otherwise formed into flat, generally thin slice shaped portions. Any potato traditionally used for conventional deep frying food chip processes may be used. Some varieties of potato that have normally been undesirable for deep frying may be used. The present invention may be used to prepare food chips from raw vegetables, potatoes and the like that have been cut into slices. The method of the present invention is also suitable for preparation of a variety of products that are flat slice shaped and traditionally baked, such as crackers, some sort of biscuits and the like. The present invention is especially adapted for the preparation of potato food chips.

Initial preparation of raw potato includes washing, scrubbing, cutting them into pieces and then washing the slices from excess starch and moisture. The slices are preferably 0.4-3 mm thick but more preferable 0.7-1.2 mm thick. The potato may have its outer shell removed by any method for peeling.

Preferably, at least the food chip contact surface of the belt comprises a non-stick material, such as e.g. of Teflon®. The belt could for instance be glass fiber belts coated partially or completely with a non-stick material such as Teflon®. The food contact surface of the heat source could also be coated with a non-stick material or for instance be made of stainless steel.

In a preferred embodiment of the present invention the heat source is a drum dryer, i.e. the belt is arranged at least partially circumferentially of the drum dryer. Preferably the drum dryer also rotates with the same speed as the belts such that friction and hence wear is avoided. For more efficient heating and drying, a heating jacket is preferably arranged circumferentially radially outside of the drum dryer and the belt.

The slices should be fed in a mono layer and fed between the belt and the heat source. If a conveyer belt accompanying the drum is used it should be very thin, preferable a Teflon® coated glass fiber belt having a thickness of 0.075 to 1 mm, more preferable 0.075-0.15 mm. Any commercial drum dryer of smaller size or up to 6 meters width and 6 meter in diameter can be used. The food contact surface of the drum dryer could be coated with a non-stick material or comprising other food grade material, e.g. stainless steel, and the food chips are scraped off from the drum dryer. The choice of heat source is of less importance. The temperature of the drum dryer could be 110-250° C. on the surface but more preferable 130-220° C. The belt should be porous or perforated, i.e. steam permeable, and covered with a heat restrained and food grade material such as Teflon® or silicon polymer, preferably a porous Teflon® coated glass fiber belt having a thickness of 0.075 to 1 mm. The belt should press against the food slices. The food slices and the belt preferably accompanies the rotation of the drum. The process time is preferably between 10 and 300 seconds but more preferably between 90 and 200 seconds. If desired the slices could be fully cooked in this stage so they reach a final moisture level of about 2-6% but they could also be partially cooked and fully dried out by other commercial available drying machines such as hot air blowers, by IR (infrared radiation) or microwaves. For economical reasons the final drying is preferably carried out by using for instance a jet blower.

An alternative embodiment of the apparatus according the invention comprises a second belt arranged such that, when in use, food chips are held between the two belts, the second belt being arranged between the first belt and the heat source, wherein at least a part of the path of the two belts are arranged adjacent said heat source and wherein the belts are arranged for synchronous movement at said part of the path for heating the food chips. Preferably, in this embodiment, at least the food chips contact surfaces of the belts comprise a non-stick material such as Teflon®. In This embodiment it is also advantageous to use a drum dryer, wherein the two belts move with the same speed and also with the same speed as the drum dryer in order to avoid friction and hence wear.

BRIEF DESCRIPTION OF THE DRAWINGS

The invention will be described in the following more in detail with reference to the drawing, wherein.

DETAILED DESCRIPTION OF THE INVENTION

Figure 1:
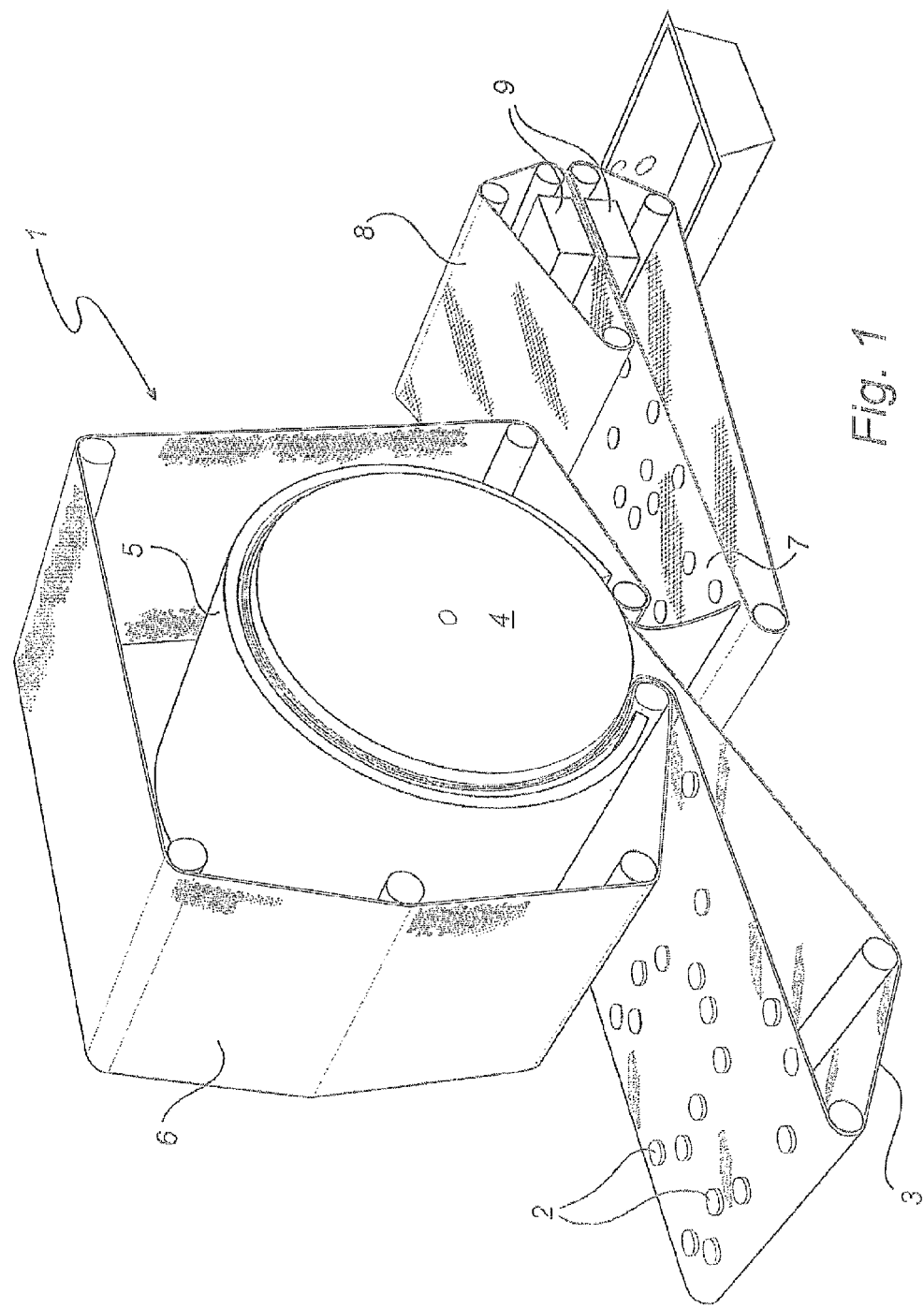
FIG. 1 is a perspective view of an embodiment of the apparatus according to the present invention.
Figure 2:
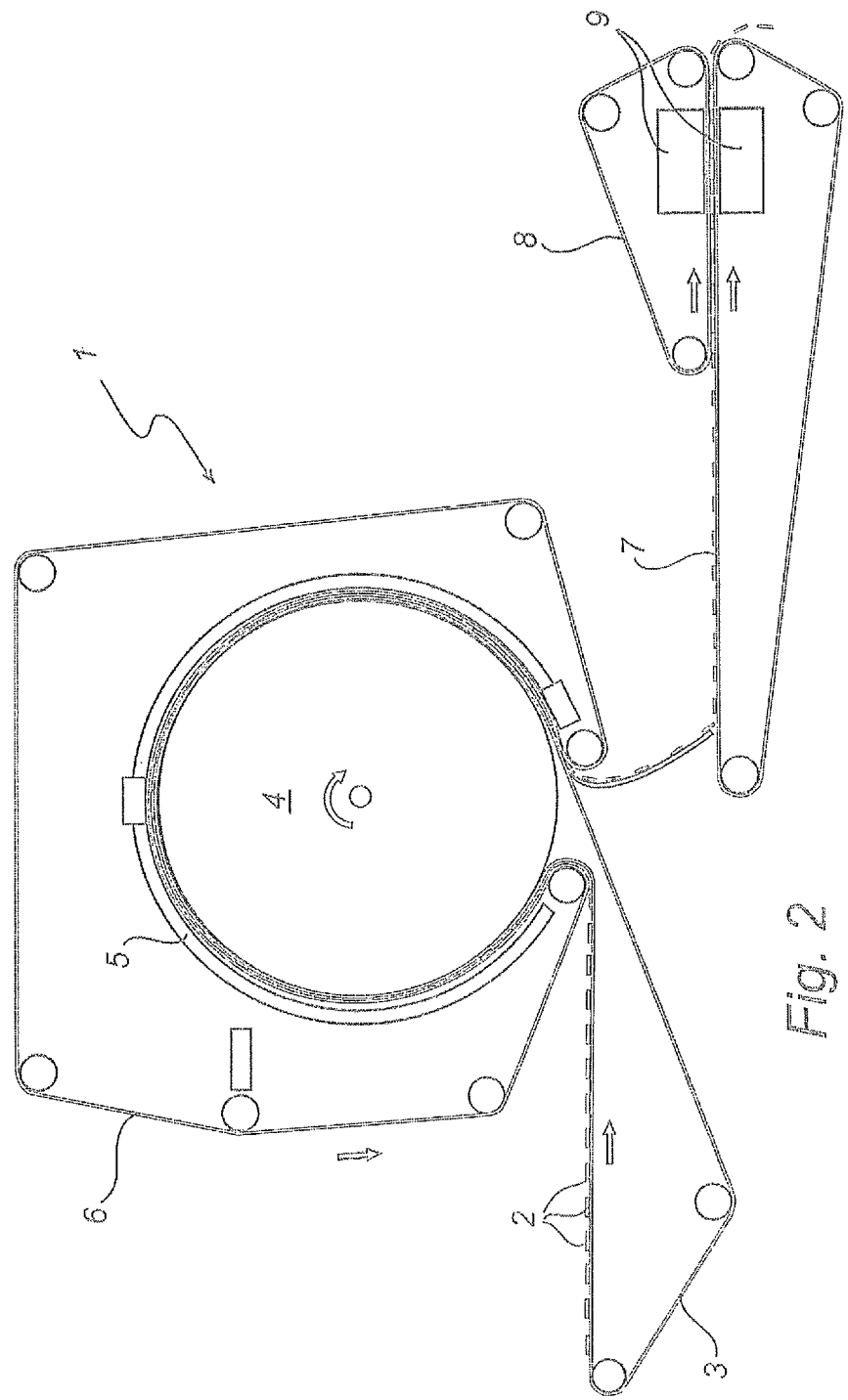
FIG. 2 is a side view of the embodiment shown in FIG. 1.

FIGS. 1 and 2 disclose an outline of an embodiment of the apparatus 1 according to the present invention. 0.8 mm slices of potato 2 are placed in a mono layer on a 0.075 mm conveyer belt 3 of glass fibre covered with Teflon®. The conveyer belt 3 and the slices of potato travels around a 2 meter wide and 2.5 meter diameter drum dryer 4 of an initial surface temperature of 175° C. Heating elements 5 of black painted steel are arranged 2.5 mm above the drum dryer 4 and set to 175° C. The slices 2 are pressed down to the drum with a 0.22 mm thick porous conveyer belt 6 of glass fibre covered with Teflon and the speed is set such that the potato slices 2 are dried for 2 minutes and 15 seconds until the slices of potato reaches a moisture level of about 30%. The slices then falls down on an open mesh conveyer belt 7 traveling with the same speed as the drying drum. A further open mesh conveyer belt 8 holds the potato slices together with the first open mesh conveyer belt 7 while the potato slices 2 are exposed to forced hot air from below and above. The blowers 9 have each an opening with a diameter of 12 mm and are set to provide air having a temperature of 200° C. and speed of 20 m/s. The potato slices 2 reaches a final moisture level of about 7%. The potato slices 2 could then optionally be fed into a seasoning unit (not shown) before the packaging.

As an alternative it is possible to feed potato slices 2 between the steam permeable conveyer belt 6 and the drum dryer 4, i.e. omitting the first conveyer belt 3. Advantageously, the drum dryer 4 surface contacting the potato slices 2 are coated/covered with a food grade material. Also, whether one or two conveyer belts are used, it is possible to two or more drum dryers 4 after one another, for instance, if there is a limitation to the height of the apparatus or for reasons of quality of the produced food. Also, a first drum dryer at a temperature about 200-220° C. could be used as a first step. The second drum dryer could be set at a slightly lower temperature of about 180-200° C. and then a third drum dryer at a temperature of about 160-170° C. could be used for the final stage. External heating elements could also be used. The above described method/apparatus could be used in order to speed up the process and at the same time minimize the risk of burning the food.

In a further embodiment dough is prepared, such as dough of corn (maize), which dough is rolled out to a thickness of about 1 mm, and raw dough chips are punched out of the dough sheet. The raw dough chips being punched out of the dough sheet are subsequently fed onto the conveyor belt of the apparatus described above for further heat treatment and finalizing seasoning and packaging.

Example 1

A dough of maize flour comprising 30% water, 20% cold swelling maize flour, and 50% maize flour was rolled out to a thickness of about 1 mm, and raw dough chips was punched out of the dough sheet. The raw dough chips being punched out of the dough sheet was subsequently fed onto the conveyor belt of the apparatus described above and were preheated at 210° C. for 20 sec., heated in the drum drier at 240° C. for 20 sec., and finally treated using hot at a temperature of 200° C. for 30 sec. The final maize chips were crunchy.

Example 2

A normal recipe to prepare baked chips comprises potatoflakes 20% by weight, potato granules 20% by weight, potato starch 50% by weight and pregelatinized starch 10% by weight. Water is added to a dough which is rolled out to a thickness of 0.5 mm from which chips ovals are punched and treated in the apparatus and in accordance with above.

Example 3

Another recipe comprises potato starch 85% dry matter, pregelatinized starch 15% dry matter and heat stable aromas of potato chips or nachos. The dough is rolled out to a thickness of 0.5 mm to an infinite web from which chips formed or nachos formed pieces are punched out on a sheet of Teflon®. The sheet of Teflon® will transferred through preheating zone for 10 sec at 200° C. before the drum containing heating elements placed 2 to 4 mm over and underneath the sheet. The sheet is heat treated at the drum for 15 sec whereupon the chips 200° C. for 40 sec. The finalized chips may become sprayed with a solution of 6% maltodextrin and water (50:50 by weight), and is powdered with 6% seasoning, such as a tzatziki seasoning. The chips obtained will be fat free and have a high content of resistant starches.

The foregoing is a disclosure of preferred embodiments for practicing the present invention. However, it is apparent that device incorporating modifications and variations will be obvious to one skilled in the art. Inasmuch as the foregoing disclosure is intended to enable one skilled in the art to practice the instant invention, it should not be construed to be limited thereby, but should be construed to include such modifications and variations as fall within the scope of the claims. For instance, the optimum time for the process in the apparatus according to the invention will be different if the food is preheated or pre-treated in some way.

What is claimed is:

1. A method for making food chips, comprising;
   feeding sliced food in a mono layer between a steam permeable conveyer belt and a heat source, the heat source contacting the sliced food, directly or via a second belt, steam or vaporized water originating from the thus heated sliced food leaving the sliced food through the steam permeable belt; and
   recovering the thus dried sliced food from the conveyor belt, and wherein the heat source is a drum dryer.

2. A method according to claim 1, further comprising holding the sliced food using an open mesh conveyer belts and moving the belts to pass through forced hot air.

3. A method according to claim 1 or 2, further comprising applying a pressure on the food and the heat source with the belt conveyer by pressing the food down to the heat source with the belt conveyer.

* * * * *